E. MEITNER.
ELECTRICAL TRANSMISSION SYSTEM.
APPLICATION FILED OCT. 3, 1917.

1,391,652.

Patented Sept. 20, 1921.
3 SHEETS—SHEET 1.

INVENTOR
ELMER MEITNER
BY
Herbert H. Thompson
ATTORNEY.

E. MEITNER.
ELECTRICAL TRANSMISSION SYSTEM.
APPLICATION FILED OCT. 3, 1917.

1,391,652.

Patented Sept. 20, 1921.
3 SHEETS—SHEET 2.

INVENTOR
ELMER MEITNER
BY
Herbert H. Thompson
ATTORNEY.

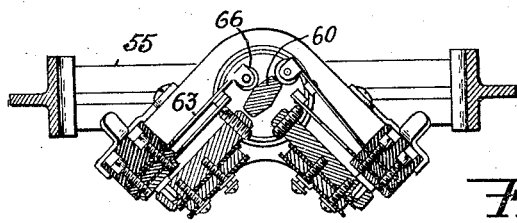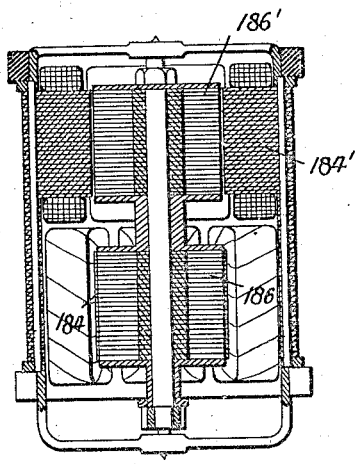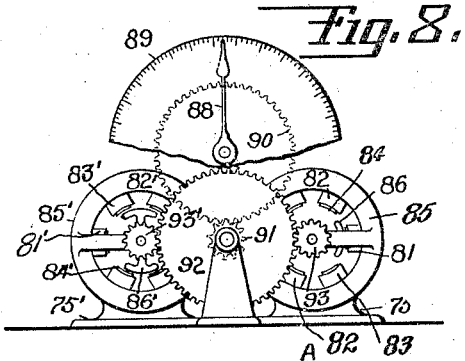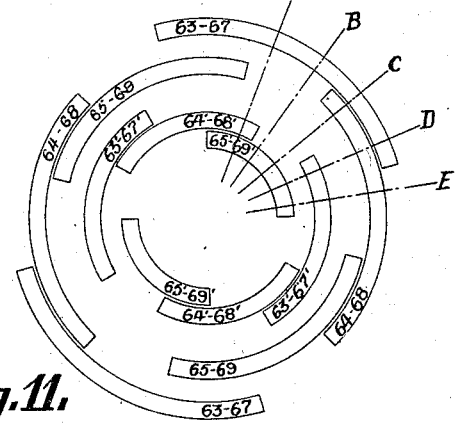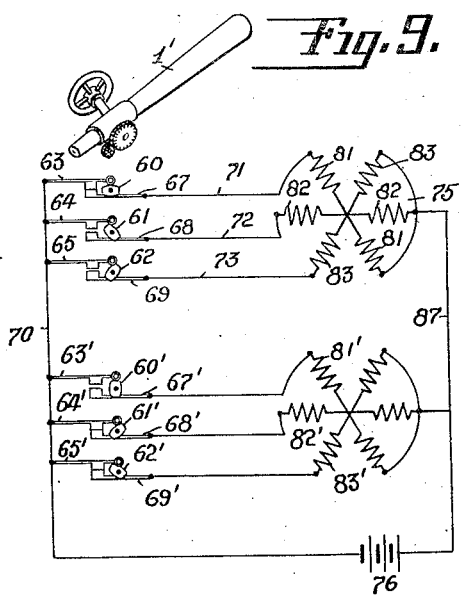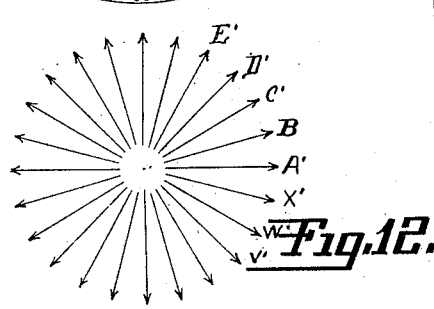

UNITED STATES PATENT OFFICE.

ELEMER MEITNER, OF BROOKLYN, NEW YORK, ASSIGNOR TO THE SPERRY GYROSCOPE COMPANY, OF BROOKLYN, NEW YORK, A CORPORATION OF NEW YORK.

ELECTRICAL TRANSMISSION SYSTEM.

1,391,652.          Specification of Letters Patent.      Patented Sept. 20, 1921.

Application filed October 3, 1917. Serial No. 194,466.

*To all whom it may concern:*

Be it known that I, ELEMER MEITNER, a subject of the King of Hungary, residing at 138 Montague street, Brooklyn, in the county of Kings and State of New York, have invented certain new and useful Improvements in Electrical Transmission Systems, of which the following is a specification.

This invention relates to transmission mechanism, more particularly to step-by-step or impulse transmission systems.

In any system operating on the impulse or step-by-step principle it is important that the number of impulses transmitted per unit of time, which I term for the purposes of this application, the speed of transmission, be kept within certain bounds. Furthermore any sudden change in the speed of transmission should be avoided. Unless these precautions are taken the receiver is apt to drop out of step with the transmitter and consequently the accuracy of the readings become disturbed.

One of the objects of this invention is to provide means for preventing the transmitter speed from exceeding a certain predetermined value and for preventing any sudden change in the speed of transmission.

It is also important that the number of steps per cycle of the receiver or repeater be made as large as possible in order that the movement of the receiver be uniform and smooth and a maximum torque exerted. I have devised a system of transmission whereby, although using repeaters each of $n$ poles, $4n$ steps per cycle are obtained.

Other projects and advantages will appear as the invention is hereinafter described. Referring to the drawings which illustrate what I now consider the preferred forms of my invention.

Fig. 7 is a section on the line 7—7 of Fig. 5.

Fig. 8 is an elevation of one form of receiver or repeating mechanism.

Fig. 9 is a wiring diagram illustrating a preferred form of electrical connections.

Fig. 10 is a central longitudinal section of a modified form of repeating device.

Figs. 11 and 12 are diagrams used in explaining the operating of my system.

Figure 1:
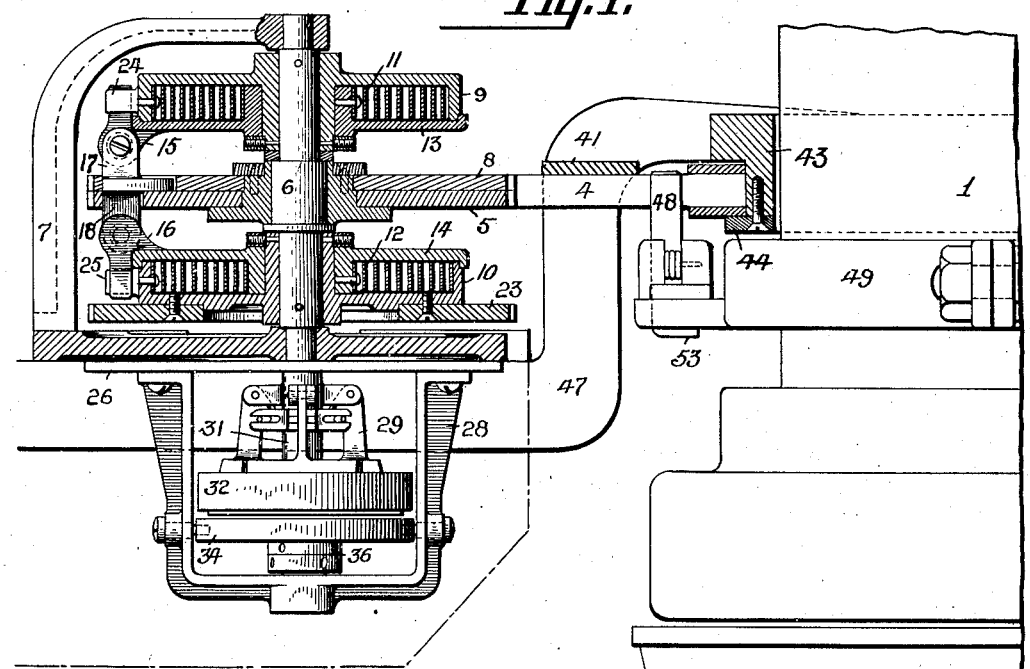
Figure 1 is a central sectional elevation of the transmitting mechanism shown applied on a periscope.

Referring to the drawings it will be seen that I have shown my transmitting mechanism applied to a periscope but it is obvious on inspection that it may be applied to any sighting device or may be simply operated by a manually operable member. The term sending instrument will therefore be used to designate the mechanism for operating the transmitting mechanism.

Figure 2:
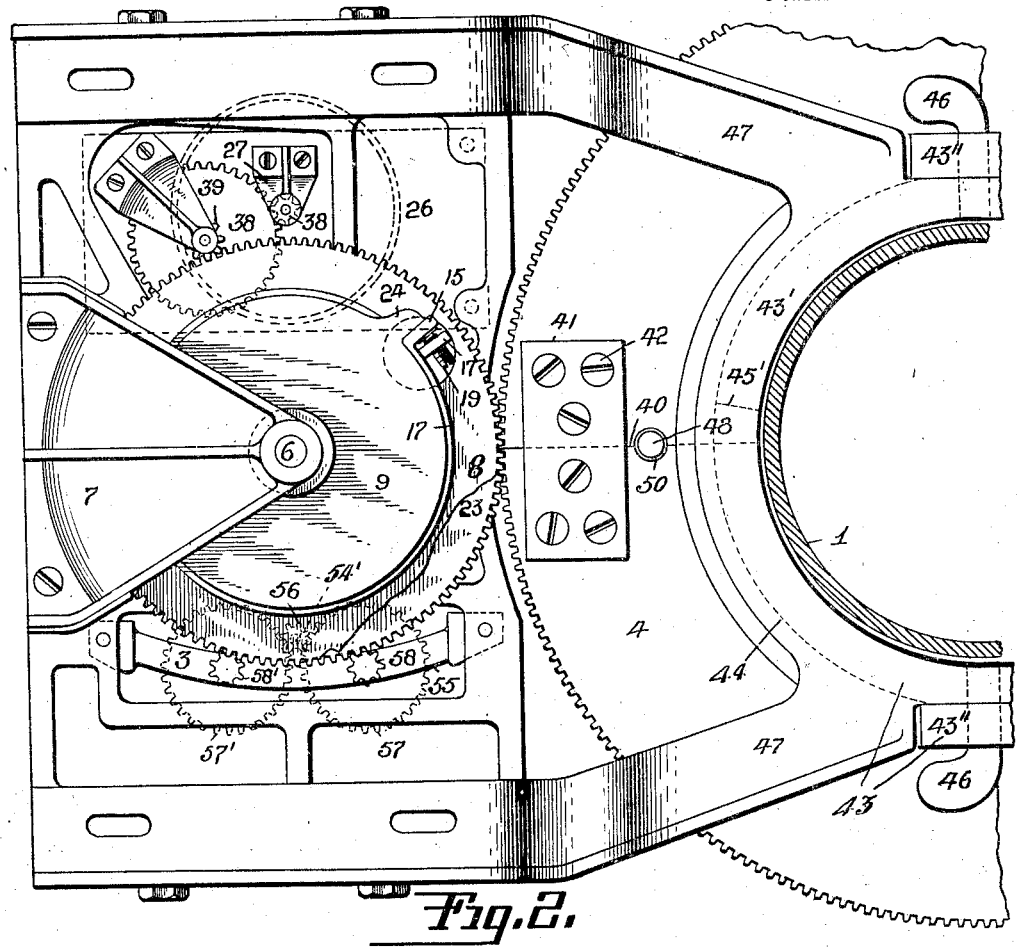
Fig. 2 is a plan view of the same.

The sending instrument or periscope 1 is adapted to be rotated by means of a handle 2 and to drive the impulse transmitter designated generally at 3 (Fig. 2). In order to prevent a sudden increase in velocity of the transmitter 3 when the sending instrument is given a jerk I provide, what may be termed, energy storing mechanism, in the connections between the sending instrument 1 and the transmitting mechanism. This energy storing mechanism which may assume various forms, is shown in the form of a resilient lost motion device constructed substantially as follows.

The gear wheel 4 is driven by the sending instrument 1, by means of connections hereinafter more specifically described, and meshes with a gear wheel 5 rotatable on a shaft 6 journaled in a stationary frame 7. A gear wheel 8 frictionally engaged with gear 5, adjustable with respect thereto and meshing with gear 4 may be provided to take up lost motion in the gears. The shaft 6 has secured thereto adjacent each of its ends a member 9, 10 each of which members may be made cup shaped so as to form part of a housing for the oppositely wound springs 11, 12 and each carries a lug 24, 25. The spring 11 is secured at one end to member 9 and the spring 12, at one end, to member 10. The opposite ends of the springs are connected respectively to members 13 and 14, rotatably mounted with respect to the members 9 and 10. The members 13 and 14 carry lugs 15 and 16 and are also shown as coöperating with members 9, 10 to inclose completely the springs 11 and 12. The gear wheel 5 carries oppositely extending lugs 17, 18 each preferably provided with an adjustable screw 19, 20. A gear wheel 23 may be secured to the member 10 and utilized to drive the transmitting mechanism.

Figure 3:
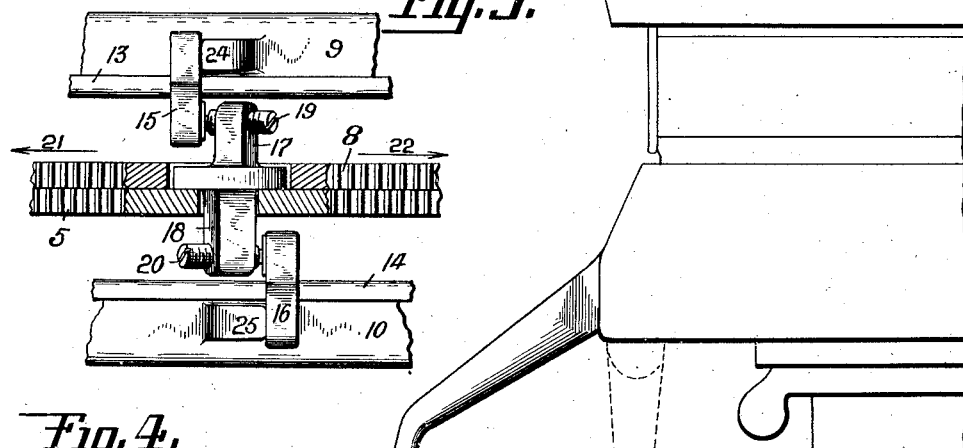
Figs. 3 and 4 are fragmentary detail views of certain of the parts shown in Figs. 1 and 2.

The operation of the energy storing means as above described i substantially as follows: Assume that the sending instrument is rotated in such a direction as to rotate gear 5 in the direction of the arrow 21 in Fig. 3. The screw 19 engages lug 15 to drive the latter and if the speed is uniform the lug 24 follows directly behind lug 15. If however an attempt is made suddenly to increase the speed the lug 24 will lag behind lug 15, due to the resilient connection 11 and the inertia of the parts and will follow the latter at a smoothly increasing speed until it catches up to said lug 15. The action for rotation of gear wheel 5 in the direction of the arrow 22 is substantially the same and need not be described.

It is not only important to prevent jerks in speed but also to prevent the speed of transmission from exceeding a predetermined allowable value. I accomplish this function by connecting a speed limiting device to the transmitting mechanism.

Figure 6:
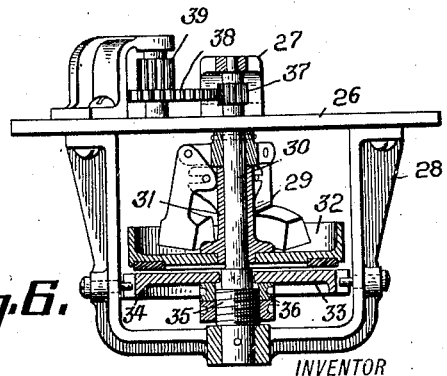
Fig. 6 is a detail central sectional elevation of the speed limiting mechanism.

One form of speed limiting device is shown in Figs. 1 and 2 and more in detail in Fig. 6. A speed responsive device, such as a governor 29 is secured to a shaft 30 journaled in base 26, of frame 7 and in brackets 27 and 28 secured thereto. The sliding sleeve 31 of the governor has secured thereto a friction disk 32 adapted to engage a coöperating friction disk 34 adjustably carried by the bracket 28 by means of a screw threaded post 35, secured to the latter, and nuts 36. The shaft 30 is rotatably connected with gear wheel 23 through gear train 37, 38, 39.

As soon as the speed of the gear wheel 23 (and consequently of the transmitting mechanism 3) reaches the predetermined value the disk 32 engages disk 34 to prevent a further increase of speed, the energy storing means being called into action by this operation to allow the sending instrument to step ahead of the gear 23.

It is clear that if the sending instrument is operated smoothly below the predetermined speed the transmitting mechanism follows along without any lag. If the sending instrument is jerked the energy storing means comes into action, as previously described, to prevent the jerk from reaching the transmitting mechanism. If the speed at which the sending instrument is operated tends to drive the transmitting mechanism at a speed above the predetermined allowable speed the speed limiting device holds the speed of the latter down and calls the energy storing means into operation.

If my system is used in connection with a periscope, I prefer to so design the parts as to render it possible to apply the system to existing periscopes. Furthermore I prefer to provide means whereby the periscope may be raised and lowered without deranging the system.

To accomplish the above functions the gear 4 may be split as at 40 so that it may be placed around the periscope 1. The ends of the gear may then be joined by a plate 41 secured thereto in any suitable manner as by means of screws 42. The said gear 4 is shown as rotatably mounted on a stationary ring 43 which is L-shaped in cross-section and provided at its bottom with a detachable annulus 44 to hold said gear in position. The annulus 44 is shown split at 45' so that it may be sprung around the periscope 1. The ring 43 is made in two parts 43', 43" so that it may be readily positioned around the periscope. The parts 43', 43" may be detachably secured to each other, when in position, by means of pins 46 and one of the halves of the ring, 43' is connected integrally or otherwise, to a pair of brackets 47 secured to frame 7.

Figure 4:
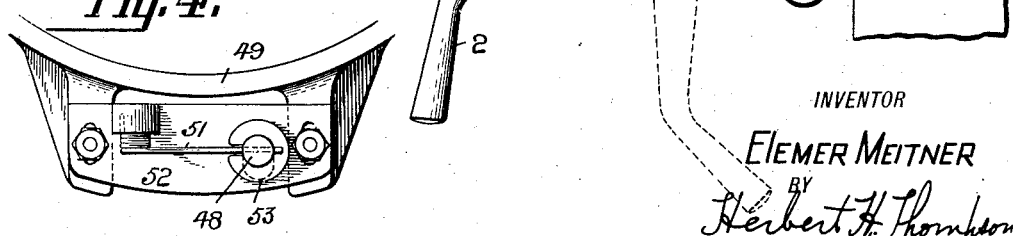

The driving connection between the gear 4 and periscope 1 may assume the form of pin 48 adapted to engage in a hole 50 in gear 4 and carried by a split clamp 49 on the periscope. The pin 48 is preferably resiliently supported on clamp 49 (see Fig. 4) as by means of a spring 51 passing at one end through pin 48 and secured at its other end to the base 52 which is in turn secured to clamp 49. The upward movement of the pin 48 by the spring 51 may be limited by upsetting the lower end thereof as at 53.

It will be readily appreciated in view of the foregoing that my invention may be applied with great facility to existing periscopes and the periscope in connection with which it is used may be raised and lowered without deranging the system. Thus suppose the parts are in the position shown Fig. 1 and it is desired to lower the periscope. The latter is simply dropped vertically, the pin 48 leaving hole 50, thus breaking the driving connection between gear 4 and the periscope. The latter may then be rotated in azimuth without changing the position of the transmitting mechanism. If it is desired to raise the periscope and reëstablish the driving connection the periscope is raised vertically and rotated in azimuth until the pin 48 slips home in hole 50. By virtue of the pin 48 and hole 50 it is obvious that the angular relationship existing between gear 4 and periscope 1 before breaking the driving connection must be reëstablished before the driving connection can be reëstablished or restored.

Figure 5:
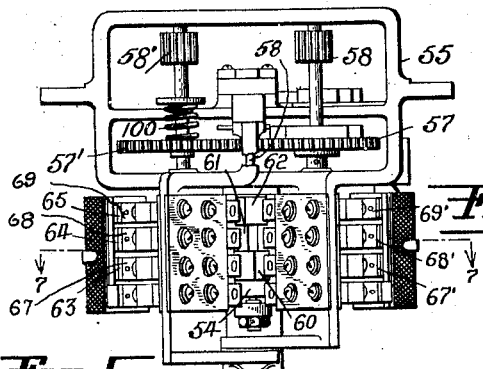
Fig. 5 is a detail elevation of one form of transmitter.

The apparatus thus far described is capable of use with any type of impulse transmitter. A preferred type of transmitter is illustrated in detail in Figs. 5 and 7 and the connections to the sending instrument are shown in Fig. 2. This transmitter, designated generally as 3 is provided with a cam drum 54 rotatably mounted in a bracket 55 secured to base 26 of frame 7. The drum shaft 54' carries at its upper end a pinion 56 adapted to be driven by gear wheel 23 through a gear train 57, 58. An additional gear train 57', 58' may be provided between pinion 56 and gear 23 for the purpose of preventing lost motion between said last named elements, the gear 57' being loose on its shaft and connected thereto by a spring 100 thereby causing said gear 57' to tend to turn with respect to its shaft. The drum 54 is provided with a plurality of cams 60, 61, 62 which may be of any desired number and which will be described more in detail hereinafter. Mounted on a downwardly extending portion of bracket 55 are a plurality of spring contacts 63, 64, 65 (see Figs. 7 and 9,) equal in number to the number of cams provided and preferably each provided at its free end with a roller 66 adapted to engage a corresponding cam. The contacts 63, 64 and 65 are each adapted to engage a corresponding one of a series of relatively fixed contacts 67, 68, 69 carried by the bracket 55 and insulated from each other and at their supporting ends from said contacts 63, 64, 65.

As stated previously the number of cams may be varied and so also the shape of each cam and the angular relationship of the various cams may be widely varied. Merely by way of illustration I have shown three cams each so shaped as to permit closure of the corresponding set of contacts 63, 67; 64, 68; or 65, 69 as indicated in Fig. 11. Thus contacts 63, 67 are closed for 90°, then open for 90°, then closed again for 90° and open for the remaining 90° of the revolution. Contacts 64, 68 are shown as closing 60° behind contacts 63, 67 and contacts 65, 69, 60° behind contacts 64, 68. By employing suitable electrical connections impulses due to these closures may be sent to a receiving or repeating device.

Various forms of electrical connections may be adopted of which one form is shown in Fig. 9. The contacts 63, 64, 65 are each shown as connected to a common return wire 70, which is connected to a battery or other source 76. The contacts 67, 68, 69 are each connected to a corresponding wire 71, 72, 73. A step-by-step repeating instrument may be inserted between the free terminal of source 76 and wires 71, 72 and 73 to receive or repeat the indication transmitted.

As, with the particular number of transmitter cams and contacts illustrated, six impulses per revolution of the transmitter are sent I employ a repeating device of six poles although it is obvious that other types of repeaters than the one illustrated may be used. This repeating device is shown (see Figs. 8 and 9) as a repeater motor 75 comprising three pairs of coils 81, 82 and 83 each mounted on a pole piece 84 which pole pieces are secured to a yoke 85. An armature 86 is rotatably mounted with respect to the poles 84 and will assume a position depending on which coils are energized.

The coils of each pair 81, 82, 83 are connected to each other and each pair is connected at one end by a common return wire 87 to source 76 and at the other end to a corresponding wire 71, 72 or 73.

Calling attention to Fig. 11 let us assume that contacts 63, 67 have just closed. The coils 81 will then be energized and the armature 86 will assume a position in line with these coils. 60° later contacts 64, 68 close to energize coils 82, coils 81 remaining energized. The armature now assumes a position between coils 81 and 82. 30° later contacts 63, 67 open so that coils 82 are now alone energized. The armature now travels to a position in line with coils 82, etc. It will be seen that with the arrangement illustrated the armature will travel twelve steps per cycle—i. e., a number of steps per cycle equal to 2 $n$ where $n$ is the number of poles.

The armature 86 as pointed out above will repeat the movements of the transmitter so that it may be utilized to control or actuate an indicator. Thus a pointer 88 coöperating with a scale 89 may be driven by the motor 75 by connecting said pointer with the armature 86 by means of a train of gearing 90, 91, 92 and 93. By selecting the proper gear ratios and scale the pointer 88 may be employed to indicate, at a distance, the position of the periscope 1 in azimuth or the angular position of any other sending instrument employed.

As the repeater motor armature moves step-by-step the movement of pointer or other indicator 88 is also step-by-step. The accuracy of the reading or position indication is therefore dependent on the number of steps per cycle—i. e. by increasing the number of steps per cycle the accuracy of the reading may be enhanced. The number of steps per cycle of the indicator is dependent on two factors—i. e. the speed of transmission and the number of steps per cycle in the repeater motor. As has been previously pointed out the speed of transmission cannot be raised above a certain amount or the instruments will drop out of step. It therefore becomes important to increase the number of steps per cycle of the repeater motor.

It should be borne in mind that the transmitters may be driven by means other than a periscope. Thus, as diagramatically indicated in Fig. 9, they may be driven by a telescope 1' rotatable about a horizontal axis.

I have disclosed two forms of systems, in my companion application Serial Number 61,480 filed Nov. 15, 1915, Patent Number 1,373,442, issued April 5, 1921 for increasing the number of steps per cycle to four times the number of poles of each repeater motor employed. One of these systems is embodied in the present application and to this extent the latter is a continuation of the prior application.

Viewed from a somewhat generic aspect the last mentioned feature comprises employing, instead of one repeater motor, a plurality of repeater motors so interconnected that at certain times the armature of one holds back or exerts a torque on an armature of at least one of the other motors.

While any number of repeater motors of any number of poles may be utilized I have for the sake of simplicity illustrated but one additional repeater motor 75' identical in construction to the repeater motor 75, similar parts being designated by the same reference characters, with an added prime. The repeater motor armature 86' is mechanically connected to armature 86 and pointer 88 by a pinion 93' meshing with gear 92. The angular relationship of armatures 86 and 86' may be of any suitable value and is here shown as 90°.

While an entirely independent transmitter might be employed for the repeater motor 75' I have shown merely an additional set of contacts 63', 64', 65', 67', 68' and 69' similar to the contacts for repeater motor 75 and operated by the same cam drum 54. I have shown the two sets of contacts spaced approximately 90° (see Figs. 7 and 11) although this angle may assume other values.

Assuming that the connections are made as shown and the parts in the position shown in Figs. 8 and 9 it will be found that the radial line A in Fig. 11 will indicate the contacts closed at this time. Thus contacts 63—67, 64'—68' and 65'—69' are closed at this time to energize coils 81, 82' and 83' causing the armature 86 to assume a position in line with coils 81 and armature 86' to assume a position between coils 82' and 83' as indicated in Fig. 8. It is clear that in this condition neither of the armatures 86, 86' exerts a torque or pull on the other. Now plotting angular positions of armature 86 in Fig. 12 the armature 86 is in position A', which is parallel with the position of armature 86 in Fig. 8. Now assume that the transmitter cam drum 54 moves through 15°—i. e., contacts along line B in Fig. 11 are established. It will be seen that contacts 63—67 and 65'—69' are now closed (contacts 64'—68' having opened) to energize coils 81 and 83'. Armature 86 now tends to maintain a position in line with coils 81 and armature 86' a position in line with coils 83' which positions are 120° apart. The armatures however are constrained, mechanically, to maintain an angular distance of 90° and as a consequence the armature 86 will occupy a position 15° from the line of coils 81—i. e., a position indicated at B' in Fig. 12. By assuming additional successive angular movements of 15° by the transmitter, such as C, D, E, etc., it will be found that the armature 86 will occupy corresponding positions C', D', E', etc., giving twenty-four steps per cycle—i. e. double the number of steps possible when using one repeater motor alone. Positions A', B', etc., of Fig. 12 are parallel with the respective positions occupied by armature 86 of repeater motor 75 with coils 81, 82, and 83 positioned as shown in Fig. 8. Thus, position A', as has been previously pointed out, is parallel with coils 81 of Fig. 8, and positions B', C', etc., are parallel to successive positions of the armature of motor 75 as it moves through one revolution with respect to the arrangement of coils of Fig. 8.

As previously stated the particular design and angular relationship of parts set forth above is merely for purpose of illustration and is susceptible of various modifications. The important feature of the double transmission system as herein disclosed is that one repeating device exerts a torque on the other at periodic intervals. So as to increase the number of steps per cycle. The armatures of the repeaters instead of being interconnected by gearing may be mounted on the same shaft. Thus in Fig. 10 the armatures 186, 186' are mounted on a common shaft. Furthermore, instead of placing the armatures at an angle to each other they may be placed in similar positions and the field poles of the repeaters offset with relation to each other. Such an arrangement is illustrated in Fig. 10 in which the armatures 186, 186' are in line and the field poles 184 staggered with relation to the poles 184'. Fig. 10 also illustrates that the field poles of the repeater may be mounted in a common frame.

It will be clear from the foregoing disclosure that I have provided a step-by-step transmission which is accurate and reliable in operation, in that the instruments will not drop out of step regardless of the speed of operation of the sending instrument and the number of steps per cycle is greatly increased over the number possible with a single repeater or a plurality of repeaters connected in the ordinary way.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted and some of the features of each modification may be embodied in the others without interfering with the more general results outlined, and the invention extends to such use.

Having described my invention, what I claim and desire to secure by Letters Patent is:

1. In combination, a sighting instrument, impulse transmitting mechanism connected to said instrument, means for disconnecting said instrument from said mechanism and means for preventing restoration of said connections unless said instrument is restored to the same relationship, with respect to said mechanism, which existed before the disconnection was effected.

2. In combination, impulse transmitting mechanism, a step-by-step repeating device of a predetermined number of steps per revolution, said repeating device being connected to said mechanism, and means, including another step-by-step repeating device connected to said first mentioned device, for increasing the number of steps per revolution of said first mentioned device.

3. In combination, impulse transmitting mechanism, a plurality of step-by-step repeating devices connected to said transmitting mechanism and means connecting said repeating devices whereby the number of steps per revolution of said repeating devices exceeds that of any one of said repeating devices when operating alone.

4. In combination, impulse transmitting mechanism, a plurality of step-by-step repeating devices each connected to said transmitting mechanism and means connecting said devices for causing at least one of said devices to cause at least one other of said devices to execute a number of steps per revolution exceeding the normal number of steps of the latter when acting alone.

5. In combination, impulse transmitting mechanism, a plurality of step-by-step repeating mechanisms, connections between said repeating mechanisms, and between said repeating mechanisms and transmitting mechanism, for causing one of said repeating mechanisms to move another of said repeating mechanisms in opposition to the torque of the latter.

6. In an electrical impulse transmission system, a cam, a plurality of relatively fixed angularly spaced electrical contacts actuatable by said cam, and a plurality of repeating devices each connected to a corresponding one of said contacts, said repeating devices being also connected to each other so that one may exert a torque on the other.

7. In an electrical impulse transmission system, a cam, a plurality of relatively fixed, angularly spaced electrical contacts actuatable by said cam and a plurality of repeating devices each connected to a corresponding one of said contacts.

8. In combination, a periscope, impulse transmission mechanism, means comprising a clutch connecting said periscope and transmission mechanism and means for raising and lowering said periscope with respect to said transmission mechanism.

9. In combination, a sending instrument, electrical impulse transmitting mechanism operatively connected thereto, means for preventing the speed of said mechanism from exceeding a predetermined amount regardless of the speed of movement of said instrument, an indicating instrument, a step-by-step repeating device connected to said instrument, electrical connections between said mechanism and device and means comprising a repeating device connected to said first mentioned repeating device for increasing the number of steps per revolution thereof.

10. In combination, a pair of resiliently connected relatively rotatable elements, a second pair of resiliently connected relatively rotatable elements, a sending instrument for actuating one of the elements of each pair and an impulse transmitter operatively connected to both of the remaining elements.

11. In combination, a pair of resiliently connected relatively rotatable elements, a second pair of resiliently connected relatively rotatable elements, a sending instrument for actuating one of the elements of each pair, an impulse transmitter operatively connected to both of the remaining elements, and speed limiting means connected to said transmitter.

12. In combination, a step-by-step repeating device comprising a multi-pole stator element and a rotor element, a second step-by-step repeating device comprising a multi-pole stator element and a rotor element, at least one of the elements of said second device being offset with respect to the corresponding element of said first device, and means connecting the rotors of said devices whereby actuation of one causes actuation of the other.

13. In a transmission device, a rotatable part, a plurality of separate shock absorbing devices actuated thereby, each of said devices comprising a plurality of elements resiliently interconnected, and a transmitter connected to said devices, one of said devices being adapted to actuate said transmitter in one direction and another of said devices being adapted to actuate said transmitter in another direction.

14. In a transmission device, a rotatable part, a plurality of separate shock absorbing devices actuated thereby, each of said devices comprising a plurality of stop elements resiliently interconnected, and a transmitter connected to said devices, one of said devices being adapted to actuate said transmitter in one direction and another of said devices being adapted to actuate said transmitter in another direction.

15. In combination, a plurality of step-by-step repeating devices each comprising a rotor and a stator having a plurality of pairs of poles, and means for causing said rotors periodically and asynchronously to move each other.

16. In combination, a step-by-step repeating device comprising a rotor element and a stator element having a plurality of pairs of poles, a second step-by-step repeating device comprising a rotor element and a stator element having a plurality of pairs of poles, at least one of the elements of said second device being offset with respect to the corresponding element of said first device, and means connecting the rotors of said devices whereby actuation of one causes actuation of the other.

In testimony whereof I have affixed my signature.

ELEMER MEITNER.